United States Patent
Zhao et al.

(10) Patent No.: US 12,309,848 B2
(45) Date of Patent: May 20, 2025

(54) RANDOM ACCESS METHOD AND APPARATUS

(71) Applicant: Huawei Technologies Co., Ltd., Shenzhen (CN)

(72) Inventors: Li Zhao, Shanghai (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 481 days.

(21) Appl. No.: 17/515,045

(22) Filed: Oct. 29, 2021

(65) Prior Publication Data

US 2022/0053558 A1 Feb. 17, 2022

Related U.S. Application Data

(63) Continuation of application No. PCT/CN2020/087698, filed on Apr. 29, 2020.

(30) Foreign Application Priority Data

Apr. 30, 2019 (CN) .......................... 201910360371.3

(51) Int. Cl.
*H04W 74/0833* (2024.01)
*H04W 24/08* (2009.01)
(Continued)

(52) U.S. Cl.
CPC ....... *H04W 74/0836* (2024.01); *H04W 24/08* (2013.01); *H04W 72/23* (2023.01);
(Continued)

(58) Field of Classification Search
CPC ... H04W 74/085; H04W 24/08; H04W 72/23; H04W 74/004; H04W 74/0866; H04W 74/0858; H04W 74/006; H04W 74/0833
See application file for complete search history.

(56) References Cited

U.S. PATENT DOCUMENTS

2014/0233528 A1* 8/2014 Webb ................... H04L 5/0094
370/330
2015/0131633 A1* 5/2015 Park .................. H04W 74/0833
370/336
(Continued)

FOREIGN PATENT DOCUMENTS

CN 102067704 A 5/2011
CN 102231917 A 11/2011
(Continued)

OTHER PUBLICATIONS

"Considerations on 2-Step RACH Procedures," 3GPP TSG RAN WG1 Meeting #96, Athens, Greece, R1-1901627, Total 11 pages, XP051599324, 3rd Generation Partnership Project, Valbonne, France (Feb. 25-Mar. 1, 2019).
(Continued)

*Primary Examiner* — Omer S Mian
(74) *Attorney, Agent, or Firm* — Leydig, Voit & Mayer, Ltd.

(57) ABSTRACT

This application provides a random access method and apparatus. The method includes: sending, to a network device, a random access signal and first information used for contention resolution; monitoring a first response and a second response, where the first response is a response to the random access signal and includes an uplink grant, and the second response is a response to the first information used for contention resolution; and when detecting the first response, and detecting the second response before a time domain position of the uplink grant, determining that random access succeeds; or when detecting the first response, sending second information used for contention resolution by using the uplink grant, and when detecting the second response or a third response, determining that random access (Continued)

succeeds, where the third response is a response to the second information used for contention resolution.

17 Claims, 4 Drawing Sheets

(51) Int. Cl.
*H04W 72/23* (2023.01)
*H04W 74/00* (2009.01)
*H04W 74/08* (2024.01)
*H04W 74/0836* (2024.01)

(52) U.S. Cl.
CPC ..... *H04W 74/004* (2013.01); *H04W 74/0833* (2013.01); *H04W 74/085* (2013.01); *H04W 74/0866* (2013.01)

(56) References Cited

U.S. PATENT DOCUMENTS

| | | | |
|---|---|---|---|
| 2018/0103465 A1 | 4/2018 | Agiwal et al. | |
| 2018/0279375 A1 | 9/2018 | Jeon et al. | |
| 2021/0378019 A1* | 12/2021 | Zhang | H04W 76/10 |
| 2022/0015155 A1* | 1/2022 | Lu | H04W 74/0841 |
| 2022/0124813 A1* | 4/2022 | Cao | H04L 5/0048 |
| 2022/0132580 A1* | 4/2022 | Ohara | H04W 74/002 |

FOREIGN PATENT DOCUMENTS

| | | |
|---|---|---|
| CN | 101641993 B | 2/2013 |
| CN | 106105366 A | 11/2016 |
| CN | 108282899 A | 7/2018 |
| CN | 108282901 A | 7/2018 |
| CN | 108632866 A | 10/2018 |
| CN | 108924964 A | 11/2018 |
| EA | 200970753 A1 | 2/2010 |
| EP | 3918866 A1 | 12/2021 |
| RU | 2684758 C2 | 4/2019 |
| WO | 2018127549 A1 | 7/2018 |
| WO | 2018157298 A1 | 9/2018 |
| WO | 2019192603 A1 | 10/2019 |
| WO | 2020159751 A1 | 8/2020 |

OTHER PUBLICATIONS

"2-Step RACH procedure for NR-U," 3GPP TSG-RAN WG2 #103bis, Spokane, USA, R2-1818098 (Revision of R2-1815157), Total 4 pages, XP051557604, 3rd Generation Partnership Project, Valbonne, France (Nov. 12-16, 2018).

"Consideration on fall back procedure from 2-step RACH to 4-step RACH," 3GPP TSG RAN WG2 Meeting #105bis, Xi'an, China, R2-1904210, Total 5 pages, XP051693438, 3rd Generation Partnership Project, Valbonne, France (Apr. 8-12, 2019).

"Channel structure for 2-step RACH," 3GPP TSG RAN WG1 Meeting #96, Athens, Greece, R1-1903056, Total 5 pages, XP051600752, 3rd Generation Partnership Project, Valbonne, France (Feb. 25-Mar. 1, 2019).

Li Xiaohui et al., "LTE mobile communications system," Xidian University Publishing House, Total 5 pages (2018). With an English translation of the Introduction.

Nokia, Nokia Shanghai Bell, "2-step RACH Procedure Feature lead summary—Update 3," 3GPP TSG RAN WG1 #96bis, Xi'an, China, R1-1905874, total 96 pages, 3rd Generation Partnership Project, Valbonne, France (Apr. 8-12, 2019).

"3rd Generation Partnership Project; Technical Specification Group Radio Access Network; NR; Medium Access Control (MAC) protocol specification (Release 15)," 3GPP TS 38.321 V15.5.0, total 78 pages, 3rd Generation Partnership Project, Valbonne, France (Mar. 2019).

NTT DOCOMO, Inc., "Discussion on Procedure for Two-step RACH," 3GPP TSG RAN WG1 #96bis, Xi'an, China, R1-1904945, total 4 pages, 3rd Generation Partnership Project, Valbonne, France (Apr. 8-12, 2019).

"3rd Generation Partnership Project; Technical Specification Group Radio Access Network; NR; Physical layer procedures for control (Release 15)," 3GPP TS 38.213 V15.5.0, total 104 pages, 3rd Generation Partnership Project, Valbonne, France (Mar. 2019).

"3rd Generation Partnership Project; Technical Specification Group Radio Access Network; NR; Radio Resource Control (RRC) protocol specification (Release 15)," 3GPP TS 38.331 V15.5.1, total 491 pages, 3rd Generation Partnership Project, Valbonne, France (Apr. 2019).

\* cited by examiner

RANDOM ACCESS METHOD AND APPARATUS

CROSS-REFERENCE TO RELATED APPLICATIONS

This application is a continuation of International Application No. PCT/CN2020/087698, filed on Apr. 29, 2020, which claims priority to Chinese Patent Application No. 201910360371.3, filed on Apr. 30, 2019. The disclosures of the aforementioned applications are hereby incorporated by reference in their entireties.

TECHNICAL FIELD

Embodiments of this application relate to the field of communications technologies, and in particular, relate to a random access method and apparatus.

BACKGROUND

A terminal device may implement uplink synchronization with a network device in a random access (RA) procedure. The random access procedure includes a contention-based random access procedure and a non-contention-based random access procedure. Currently, the contention-based random access procedure is completed through four steps: In the first step, the terminal device sends a random access request to the network device, where the random access request is also referred to as a message 1 (Msg1), and includes a random access preamble; in the second step, the network device sends a random access response (RAR) message to the terminal device, where the RAR message may also be referred to as a message 2 (Msg2); in the third step, after receiving the RAR message, the terminal device sends, on a resource allocated by the network device, a message to the network device by using a timing advance indicated by the network device, where the message may also be referred to as a message 3 (Msg3); and in the fourth step, the network device sends contention resolution information to the terminal device, where a message carrying the contention resolution information is referred to as a message 4 (Msg4). The RAR message may include a random access preamble identifier (RAP ID), and when the RAP ID matches (or is the same as) a preamble ID selected by the terminal device, it is considered that the RAR message is successfully received.

The 4-step contention-based random access procedure requires a relatively large quantity of interaction procedures and has a relatively high delay. Consequently, the procedure cannot be well applied to a scenario with a high delay requirement. Therefore, a 2-step contention-based random access procedure is introduced.

However, currently some terminal devices support both the 2-step random access procedure and the 4-step random access procedure, and consequently, the terminal device does not know how to perform an operation when balancing a delay and power consumption of the terminal device.

SUMMARY

In view of this, embodiments of this application provide a random access method and apparatus, so that a terminal device selects a proper random access type when balancing a delay and power consumption.

According to a first aspect, a random access method is provided. The method provided in the first aspect may be performed by a terminal device, or may be performed by a chip disposed in a terminal device. This is not limited in this application.

Specifically, the method includes: sending, to a network device, a random access signal and first information used for contention resolution; monitoring a first response and a second response, where the first response is a response to the random access signal and includes an uplink grant, and the second response is a response to the first information used for contention resolution; and when detecting the first response, and detecting the second response before a time domain position of the uplink grant, determining that random access succeeds; or when detecting the first response, sending second information used for contention resolution by using the uplink grant, and when detecting the second response or a third response, determining that random access succeeds, where the third response is a response to the second information used for contention resolution.

According to the random access method in this embodiment of this application, the terminal device monitors the first response and the second response respectively in a first monitoring window and a second monitoring window, so that the terminal device performs a 4-step random access procedure while performing a 2-step random access procedure. When random access of either type succeeds, it is determined that the random access of the terminal device succeeds, and therefore, a delay of the terminal device in the random access procedure is reduced.

With reference to the first aspect, in some possible implementations of the first aspect, the monitoring a first response and a second response includes: in response to transmission of the random access signal, starting or restarting a first monitoring window, and monitoring the first response in the first monitoring window; and in response to transmission of the first information used for contention resolution, starting or restarting a second monitoring window, and monitoring the second response in the second monitoring window.

It should be noted that the first monitoring window and the second monitoring window may be started or restarted at a same moment, or may be started or restarted at different moments. This is not limited in this application.

With reference to the first aspect, in some possible implementations of the first aspect, when it is determined that the random access succeeds, the second monitoring window is stopped.

With reference to the first aspect, in some possible implementations of the first aspect, in response to transmission of the second information used for contention resolution, a third monitoring window is started or restarted, and the third response is monitored in the third monitoring window.

With reference to the first aspect, in some possible implementations of the first aspect, when the second response is detected in the second monitoring window, the second monitoring window and the third monitoring window are stopped; or when the third response is detected in the third monitoring window, the second monitoring window and the third monitoring window are stopped.

In the technical solution of this application, when the terminal device first detects the second response in the second monitoring window, it indicates that the 2-step random access succeeds, so that the terminal device stops the second monitoring window and the third monitoring window, and stops the 2-step random access and the 4-step random access. Alternatively, when the terminal device first detects the third response in the third monitoring window, it indicates that the 4-step random access succeeds, so that the terminal device stops the second monitoring window and the third monitoring window. In the manner in which the 2-step random access procedure and the 4-step random access procedure are performed in parallel, the delay of the terminal device in the random access can be reduced.

With reference to the first aspect, in some possible implementations of the first aspect, when the second monitoring window expires during running of the third monitoring window, the second response stops to be monitored, and the third response continues to be monitored; and when the third response is detected in the third monitoring window, it is determined that the random access succeeds; or when the third response is not detected in the third monitoring window, random access is re-initiated.

It should be noted that after the terminal device determines that the random access fails, the random access re-initiated by the terminal device may be the 2-step random access or the 4-step random access. This is not limited in this application.

With reference to the first aspect, in some possible implementations of the first aspect, when the second monitoring window expires during running of the third monitoring window, the third monitoring window is stopped, and random access is re-initiated.

In the foregoing technical solution, after determining that the 2-step random access fails, the terminal device directly stops the 2-step random access procedure and the 4-step random access procedure, and re-initiates random access without continuing to perform the 4-step random access procedure, thereby reducing power consumption of the terminal device.

With reference to the first aspect, in some possible implementations of the first aspect, when the third monitoring window expires during running of the second monitoring window, the third response stops to be monitored, and the second response continues to be monitored; and when the second response is detected in the second monitoring window, it is determined that the random access succeeds; or when the second response is not detected in the second monitoring window, random access is re-initiated.

With reference to the first aspect, in some possible implementations of the first aspect, when the first monitoring window expires during running of the second monitoring window, the second response continues to be monitored; and when the second response is detected in the second monitoring window, it is determined that the random access succeeds; or when the second response is not detected in the second monitoring window, random access is re-initiated.

With reference to the first aspect, in some possible implementations of the first aspect, when the second monitoring window expires during running of the first monitoring window, the first response continues to be monitored, and when the first response is detected, the second information used for contention resolution is sent by using the uplink grant; and when the third response is detected, it is determined that the random access succeeds; or when the third response is not detected, random access is re-initiated.

With reference to the first aspect, in some possible implementations of the first aspect, in response to transmission of the random access signal and/or transmission of the first information used for contention resolution, a first monitoring window is started or restarted, and the first response and the second response are monitored in the first monitoring window.

In the foregoing technical solution, the terminal device simultaneously monitors the first response and the second response in one monitoring window. The first monitoring window may reuse a monitoring window in the current technology, for example, a RAR window. Alternatively, the network device may reconfigure a new monitoring window for the terminal device. This is not limited in this application.

With reference to the first aspect, in some possible implementations of the first aspect, when it is determined that the random access succeeds, the first monitoring window is stopped.

With reference to the first aspect, in some possible implementations of the first aspect, in response to transmission of the second information used for contention resolution, a second monitoring window is started or restarted, and the third response is monitored in the second monitoring window.

With reference to the first aspect, in some possible implementations of the first aspect, when the second response is detected in the first monitoring window, the first monitoring window and the second monitoring window are stopped; or when the third response is detected in the second monitoring window, the first monitoring window and the second monitoring window are stopped.

With reference to the first aspect, in some possible implementations of the first aspect, when the first monitoring window expires during running of the second monitoring window, the second response stops to be monitored, and the third response continues to be monitored; and when the third response is detected in the second monitoring window, it is determined that the random access succeeds; or when the third response is not detected in the second monitoring window, random access is re-initiated.

With reference to the first aspect, in some possible implementations of the first aspect, when the first monitoring window expires during running of the second monitoring window, the second monitoring window is stopped, and random access is re-initiated.

With reference to the first aspect, in some possible implementations of the first aspect, when the second monitoring window expires during running of the first monitoring window, the third response stops to be monitored, and the second response continues to be monitored; and when the second response is detected in the first monitoring window, it is determined that the random access succeeds; or when the second response is not detected in the first monitoring window, random access is re-initiated.

According to a second aspect, this application provides a random access apparatus. The apparatus is configured to perform the method according to any one of the first aspect or the possible implementations of the first aspect.

According to a third aspect, this application provides a random access apparatus. The apparatus includes at least one processor and an interface circuit, and the at least one processor is configured to perform the method according to any one of the first aspect or the possible implementations of the first aspect.

According to a fourth aspect, this application provides a random access apparatus. The apparatus includes at least one processor, configured to connect to a memory, to invoke a program in the memory to perform the method provided in the first aspect. The memory may be located inside the apparatus, or may be located outside the apparatus. In addition, there are one or more processors.

According to a fifth aspect, this application provides a terminal device. The terminal device includes the apparatus provided in the second aspect, or the terminal device includes the apparatus provided in the third aspect, or the terminal device includes the apparatus provided in the fourth aspect.

According to a sixth aspect, this application provides a computer-readable storage medium. The computer-readable storage medium stores a computer instruction; and when the computer instruction is run on a computer, the computer is enabled to perform the method according to any one of the first aspect or the possible implementations of the first aspect.

According to a seventh aspect, this application provides a chip. The chip includes a processor. The processor is configured to read and execute a computer program stored in a memory, to perform the method according to any one of the first aspect or the possible implementations of the first aspect.

Optionally, the chip further includes the memory, the memory and the processor are connected through a circuit or a wire, and the memory is configured to store the computer program.

Further, optionally, the chip further includes a communications interface.

According to an eighth aspect, this application further provides a computer program product. The computer program product includes computer program code; and when the computer program code is run on a computer, the computer is enabled to perform the method according to any one of the first aspect or the possible implementations of the first aspect.

According to the technical solutions of this application, the terminal device performs the 2-step random access procedure and the 4-step random access procedure in parallel, so that the terminal device can select a proper random access type when balancing the delay and the power consumption of the terminal device.

DETAILED DESCRIPTION OF EMBODIMENTS

The following describes technical solutions of this application with reference to the accompanying drawings.

Figure 1:
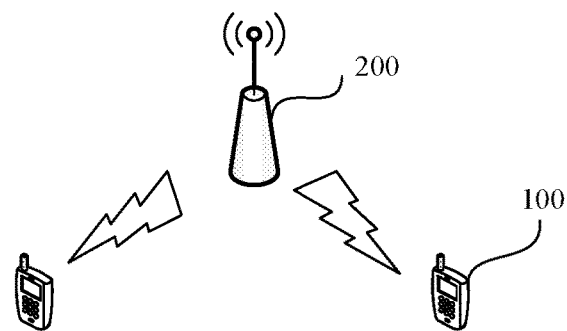
FIG. 1 is an architectural diagram of a communications system to which an embodiment of this application is applicable.

FIG. 1 is an architectural diagram of a communications system according to an embodiment of this application. As shown in FIG. 1, the communications system may include a terminal device 100 and a network device 200. Quantities of terminal devices 100 and network devices 200 are not limited in this embodiment of this application. The terminal device 100 located in coverage of the network device 200 may communicate with the network device 200 in a wireless manner. Specifically, when the network device 200 serves as a sender, the network device 200 may send downlink information to the terminal device 100. Correspondingly, the terminal device 100 serves as a receiver, and may receive the downlink information sent by the network device 200. When the terminal device 100 serves as a sender, the terminal device 100 may send uplink information to the network device 200. Correspondingly, the network device 200 serves as a receiver, and may receive the uplink information sent by the terminal device 100. The terminal device 100 may be at a fixed position, or may be mobile.

Optionally, the communications system may further include another device. For example, the communications system may further include a core network device (not shown in FIG. 1). The network device 200 may be connected to the core network device in a wireless or wired manner. The core network device and the network device 200 may be different physical devices independent of each other, or functions of the core network device and functions of the network device 200 may be integrated into a same physical device, or a part of functions of the core network device and a part of functions of the network device 200 may be integrated into one physical device. For another example, the communications system may further include a wireless relay device or a wireless backhaul device (not shown in FIG. 1).

The network device 200 is an apparatus for transmitting and receiving signals on a network side, for example, a radio access network (RAN) node that connects a terminal device to a wireless network. Currently, for example, the RAN node is a next generation base station (gNB) in a new radio access technology (NR) (or 5G) system, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a relay node, or a wireless fidelity (Wi-Fi) access point (AP). In a network structure, the network device may include a central unit (CU) node, a distributed unit (DU) node, or a RAN device including a CU node and a DU node. Wireless coverage of the network device 200 may include one or more cells. The terminal device 100 in coverage of the cell communicates with the network device 200 by using a transmission resource (for example, a frequency domain resource, a spectrum resource, or a time-frequency resource) of the cell. The cell may be a macro cell, or may be a small cell. Optionally, the small cell may include a metro cell, a micro cell, a pico cell, a femto cell, or the like. A specific technology and a specific device form used by the network device 200 are not limited in this embodiment of this application.

The terminal device 100 is also referred to as user equipment (UE), a mobile station (MS), a mobile terminal (MT), or the like, and is a device that provides a user with voice and/or data connectivity, for example, a handheld device or a vehicle-mounted device with a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote surgery, a wireless terminal in a smart grid, a wireless terminal in transportation safety, a wireless terminal in a smart city, or a wireless terminal in a smart home.

Figure 2:
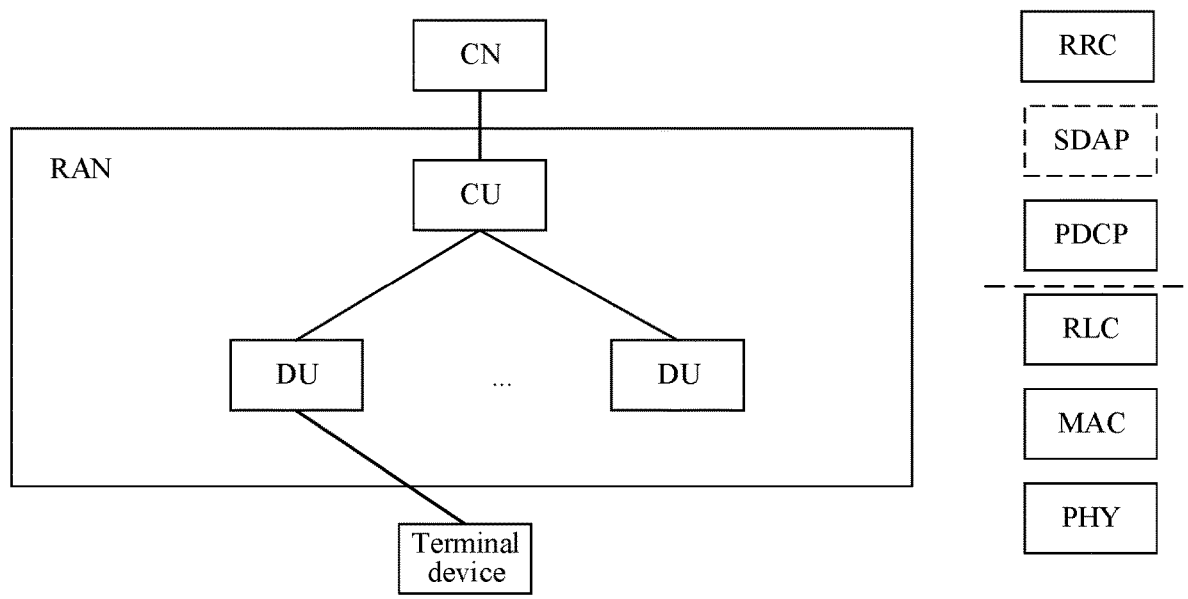
FIG. 2 is an architectural diagram of another communications system to which an embodiment of this application is applicable.

FIG. 2 is a schematic diagram of another network architecture according to an embodiment of this application. As shown in FIG. 2, the network architecture includes a core network (CN) device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, may be integrated into the baseband apparatus, or some remote parts are integrated into the baseband apparatus. For example, in a long term evolution (LTE) communications system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal device complies with a specified protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an implementation, a service data adaptation protocol (SDAP) layer is further included above the PDCP layer.

Functions of these protocol layers may be implemented by one node, or may be implemented by a plurality of nodes. For example, in an evolved structure, the RAN device may include a CU and a DU, and a plurality of DUs may be centrally controlled by one CU. As shown in FIG. 2, the CU and the DU may be divided based on a protocol layer of a wireless network. For example, functions of the PDCP layer and a layer above the PDCP layer are set on the CU, and functions of protocol layers below the PDCP layer, such as the RLC layer and the MAC layer, are set on the DU.

Division into the protocol layers is merely an example, and division may alternatively be performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, a part of functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, the division is performed based on a delay. A function whose processing time needs to meet a delay requirement is set on the DU, and a function whose processing time does not need to meet the delay requirement is set on the CU.

In addition, the radio frequency apparatus may be not disposed in the DU but is disposed remotely from the DU, or may be integrated into the DU, or some remote parts are integrated into the DU. This is not limited herein.

Figure 3:
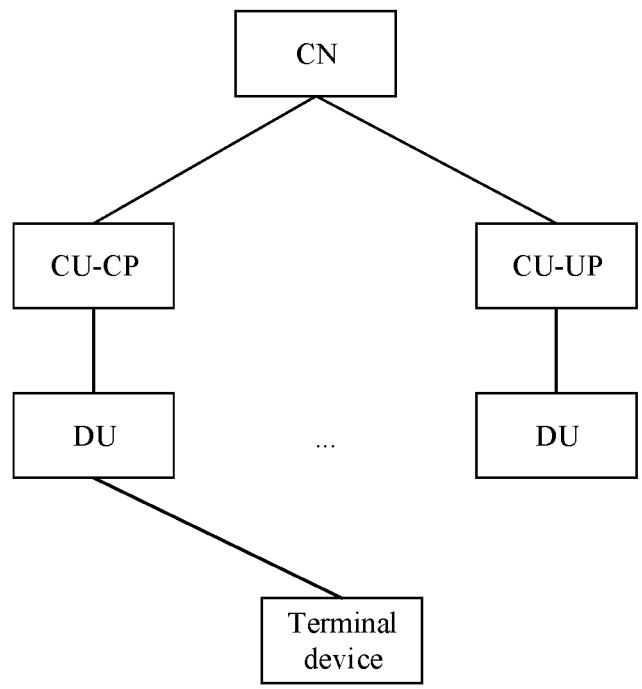
FIG. 3 is an architectural diagram of still another communications system to which an embodiment of this application is applicable.

Compared with the architecture shown in FIG. 2, further referring to FIG. 3, a control plane (CP) and a user plane (UP) of the CU may be further separated and implemented by using different entities, which are respectively a control plane CU entity (CU-CP entity) and a user plane CU entity (CU-UP entity).

In the foregoing network architecture, signaling generated by the CU may be sent to the terminal device by using the DU, or signaling generated by the terminal device may be sent to the CU by using the DU. The DU may transparently transmit the signaling to the terminal device or the CU by directly encapsulating the signaling at a protocol layer without parsing the signaling. In the following embodiments, if transmission of such signaling between the DU and the terminal device is involved, in this case, that the DU sends or receives the signaling includes this scenario. For example, signaling at the RRC layer or the PDCP layer is finally processed as signaling at the PHY layer and sent to the terminal device, or is converted from received signaling at the PHY layer. In this architecture, it may also be considered that the signaling at the RRC layer or the PDCP layer is sent by the DU, or is sent by the DU and a radio frequency unit.

In the foregoing embodiments, the CU is classified as a network device on a RAN side. In addition, the CU may alternatively be classified as a network device on a CN side. This is not limited herein.

When the foregoing CU-DU structure is used, the network device in the embodiments of this application may be a CU node, a DU node, or a RAN device including a CU node and a DU node.

Figure 4:
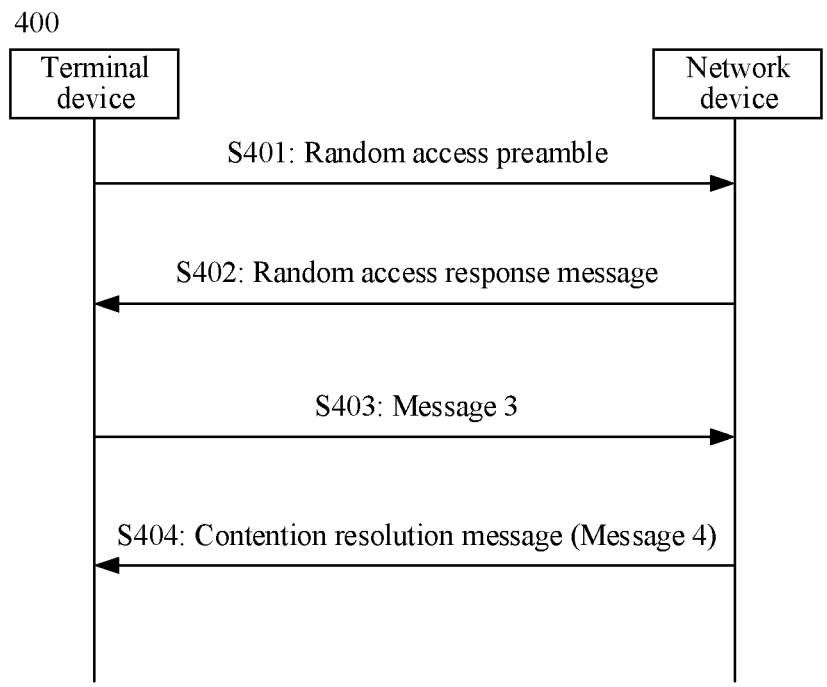
FIG. 4 is a message exchange diagram of an existing 4-step contention-based random access procedure.

A terminal device may implement uplink synchronization with a network device in a random access procedure. FIG. 4 is a message exchange diagram of an existing contention-based random access procedure. As shown in FIG. 4, the procedure mainly includes four steps, and therefore, may be referred to as a 4-step random access procedure.

S401: A terminal device sends a random access request to a network device, where the random access request is also referred to as a message 1 (Msg1), and includes a random access preamble.

Correspondingly, the network device receives the preamble, learns that the terminal device requests access, and further performs the following step S402.

S402: The network device sends a random access response (random access response, RAR) message to the terminal device, where the RAR message may also be referred to as a message 2 (Msg2).

The RAR message may include the following content: (1) a RAP ID, where the RAP ID is a preamble identifier obtained when the network device detects the preamble, and may also be referred to as a preamble index; (2) a timing advance command (TA command), where the TA command is used to specify a time adjustment (also referred to as a timing advance) required by the terminal device to perform uplink synchronization; (3) uplink grant (UL grant) information, where a UL grant is used to specify an uplink resource that is allocated by the network device to the terminal device for sending an Msg3 (a message 3); and (4) a temporary cell radio network temporary identifier (TC-RNTI), used for subsequent data transmission between the terminal device and the network device.

Correspondingly, the terminal device calculates a random access radio network temporary identifier (RA-RNTI) by using a time-frequency resource for sending the preamble, and monitors, in a RAR time window, a physical downlink control channel (PDCCH) scrambled by using the RA-RNTI, to receive a RAR corresponding to the RA-RNTI. When the terminal device performs decoding by using the RA-RNTI and successfully receives a RAR, and a RAP ID value in the RAR is the same as an index value used when the terminal device sends the preamble, it is considered that the RAR is successfully received. The terminal device starts to process the TA command, the UL grant, and the TC-RNTI that are included in the RAR. If the terminal device does not receive the RAR for the preamble within the RAR time window, it is considered that the RAR fails to be received. Subsequently, it returns to S401 to perform the 4-step contention-based random access again.

S403: The terminal device sends, based on the RAR and on the uplink resource allocated by the network device, the Msg3 (message 3) to the network device by using the timing advance indicated by the network device.

Specifically, after sending the Msg3, the terminal device starts or restarts a contention resolution timer. The Msg3 includes an identifier of the terminal device. The identifier of the terminal device is to be used for contention resolution in S404. The identifier of the terminal device may be related to a status of the terminal device in a communications system. For example, when the terminal device is in an RRC connected (RRC_CONNECTED) mode, the identifier of the terminal device may be a cell radio network temporary identifier (C-RNTI). When the terminal device is in a non-RRC connected mode, the identifier of the terminal device may be a terminal device identifier from a core network. Optionally, the terminal device identifier from the core network may be a system architecture evolution temporary mobile station identifier (S-TMSI) or a random number.

S404: The network device sends an Msg4 (message 4) to the terminal device.

The Msg4 may include contention resolution information, to indicate that the contention resolution succeeds. Optionally, the contention resolution information may be a UE contention resolution identifier MAC control element (contention resolution identity MAC CE), that is, a part of or all content of the Msg3. The contention resolution information may alternatively be a PDCCH scrambled by using a cell radio network temporary identifier (C-RNTI), that is, when detecting the PDCCH scrambled by using the C-RNTI, the terminal device considers that the contention is resolved. Correspondingly, the terminal device waits for receiving the Msg4 within the contention resolution timer. If the contention resolution timer expires and the terminal device has not received the contention resolution information, it returns to S401 to perform the 4-step contention-based random access again.

Figure 5:
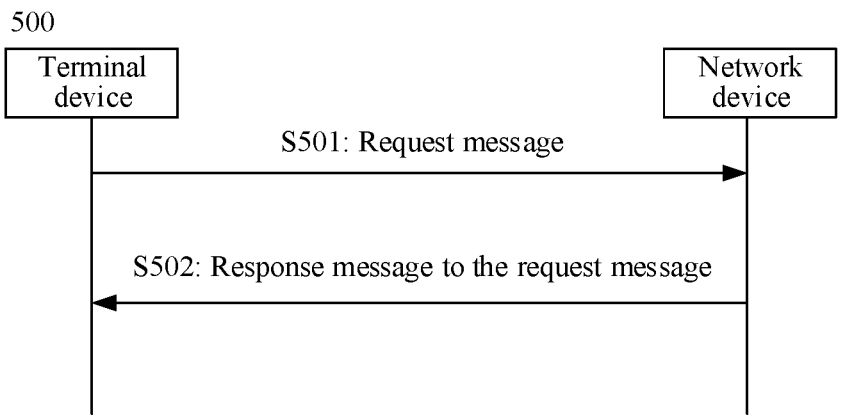
FIG. 5 is a message exchange diagram of an existing 2-step contention-based random access procedure.

The 4-step contention-based random access procedure is applied to a scenario with a relatively high delay requirement. Because there are a relatively large quantity of interaction procedures, a delay is relatively high, and consequently, it is difficult to meet the delay requirement. Therefore, a 2-step random access procedure is introduced. FIG. 5 is a message exchange diagram of a 2-step random access procedure according to an embodiment of this application. As shown in FIG. 5, the random access procedure may include the following steps.

S501: A terminal device sends a request message to a network device.

Correspondingly, the network device receives the request message sent by the terminal device.

The request message may include a random access signal and information used for contention resolution.

The random access signal is used to request random access. The network device may detect the random access signal, and learns that the terminal device requests random access.

In different communications systems or different application scenarios, the random access signal may be implemented in different manners. For example, in an NR system, the random access signal may be a preamble, a demodulation reference signal (DMRS), or another detection signal used for random access. An implementation, a length, a name, and the like of the random access signal are not limited in this embodiment of this application.

The information used for contention resolution is sent by the terminal device to the network device, and is used for contention resolution.

Optionally, the information used for contention resolution may include an identifier of the terminal device. The identifier of the terminal device may be related to a status of the terminal device in the communications system. For example, when the terminal device is in an RRC connected (RRC_CONNECTED) mode, the identifier of the terminal device may be a cell radio network temporary identifier (C-RNTI). When the terminal device is in a non-RRC connected mode, the identifier of the terminal device may be a terminal device identifier from a core network. Optionally, the terminal device identifier from the core network may be a system architecture evolution temporary mobile station identifier (S-TMSI) or a random number.

S502: The network device sends, to the terminal device, a response message to the request message.

Correspondingly, the terminal device receives the response message that is to the request message and that is sent by the network device.

The response message includes contention resolution information and a payload, and the payload in the response message may include a part of or all content of the RAR in the 4-step contention-based random access procedure. For example, the payload may include one or any combination of the following information: a UL grant, a TA command, and a TC-RNTI. Alternatively, the payload may include newly defined content, for example, a downlink assignment (DL assignment). Specific content of the payload in the response message is not limited in this application. The contention resolution information in the response message is obtained by the terminal device based on the information used for contention resolution, and is apart of or all content of the information used for contention resolution, or a PDCCH scrambled by using the C-RNTI of the terminal device, or a C-RNTI explicitly carried in the response message.

For example, referring to S404 in FIG. 4, in the 4-step contention-based random access procedure, for the terminal device that is in the RRC_CONNECTED mode, the Msg4 is implemented by using the PDCCH scrambled by using the C-RNTI. In S403, the terminal device may send the C-RNTI of the terminal device to the network device by using the C-RNTI MAC CE. In S404, when the terminal device detects the PDCCH scrambled by using the C-RNTI, the terminal device considers that the random access succeeds. In the 2-step contention-based random access procedure, for the terminal device that is in the RRC_CONNECTED mode, the terminal device has obtained the C-RNTI. In S501, in the message sent by the terminal device to the network device, the C-RNTI may be sent to the network device as the information used for contention resolution. Correspondingly, the network device may explicitly include the C-RNTI in the response message as the contention resolution information.

It can be learned from the foregoing that the 2-step random access procedure has fewer interaction procedures than the 4-step random access procedure, so that a delay in the random access can be greatly reduced, thereby meeting a new application scenario with a relatively high delay requirement, for example, an unlicensed spectrum cell, a short-delay service, or a small data packet service.

However, because some existing terminal devices can support both the 4-step random access procedure and the 2-step random access procedure, when two aspects of a delay and power consumption are considered, the terminal device does not know how to make a choice between the 4-step random access procedure and the 2-step random access procedure. In view of this, the embodiments of this application provide a random access method. When a terminal device performs a 2-step random access procedure, if the terminal device detects a response message of a random access signal, the terminal device performs backoff to a 4-step random access procedure, and continues to perform the 2-step random access procedure. In other words, the 2-step random access procedure and the 4-step random access procedure are simultaneously performed, and when either of the procedures succeeds, the terminal device determines that random access of this time succeeds, thereby greatly reducing a delay in the random access.

Figure 6:
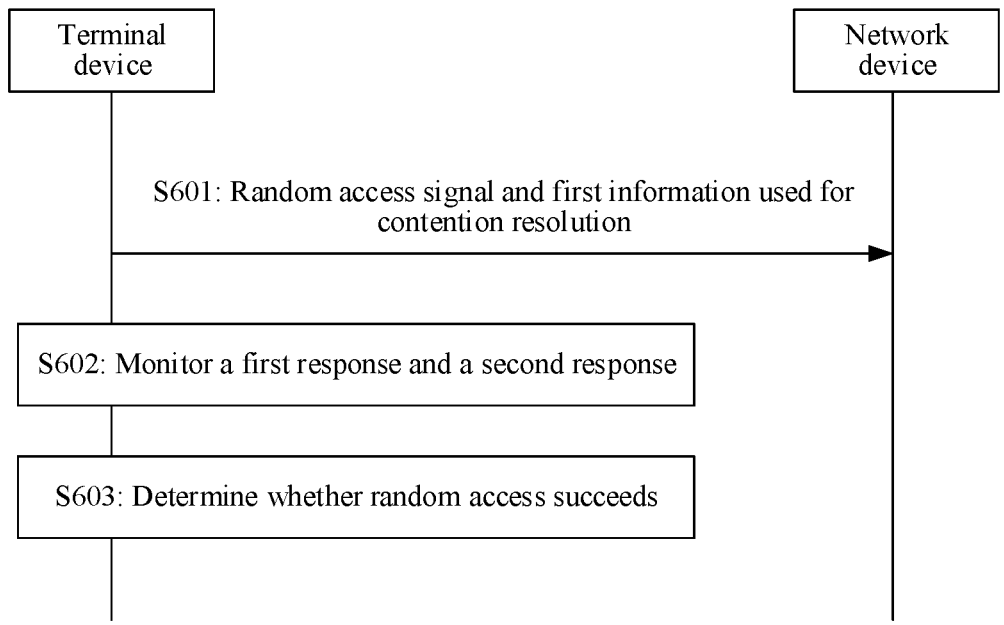
FIG. 6 is a schematic flowchart of a random access method according to an embodiment of this application.

FIG. 6 is a schematic flowchart of a random access method 600 according to an embodiment of this application. The method 600 includes steps S601 to S603. The following describes these steps in detail.

S601: Send a random access signal and first information used for contention resolution.

A terminal device sends, to a network device, the random access signal and the first information used for contention resolution. The random access signal is used to request random access; and the first information used for contention resolution is sent by the terminal device to the network device, and is used for contention resolution. For specific content, refer to the descriptions in S501. For brevity, details are not described herein again.

A manner in which the terminal device sends, to the network device, the random access signal and the first information used for contention resolution is not limited in this embodiment of this application.

S602: The terminal device monitors a first response and a second response.

After receiving the random access signal and the first information used for contention resolution that are sent by the terminal device, the network device sends the first response to the random access signal and the second response to the first information used for contention resolution, and the terminal device monitors the first response and the second response.

The first response may be an existing RAR message (a random access response) or another newly defined response message. A name of the first response is not limited in this application. The first response includes a part of or all content of a RAR in a 4-step contention-based random access procedure, and includes one or more pieces of uplink grant (UL grant) information, a timing advance command (TA command), and a TC-RNTI.

The second response is obtained by the terminal device based on the first information used for contention resolution, for example, is a part of or all content of the first information used for contention resolution, or a PDCCH scrambled by using a C-RNTI, or a C-RNTI explicitly carried in the second response.

For example, with reference to S602 in FIG. 6, for a terminal device that is in an RRC_CONNECTED mode, the terminal device has obtained the C-RNTI. In S601, in a message sent by the terminal device to the network device, the C-RNTI may be sent to the network device as information used for contention resolution. Correspondingly, the network device may explicitly include the C-RNTI in the second response as contention resolution information.

S603: The terminal device determines whether the random access succeeds.

When detecting the first response, and detecting the second response before a time domain position of an uplink grant, the terminal device determines that the random access succeeds. Alternatively, when detecting the first response, the terminal device sends second information used for contention resolution by using the uplink grant, and when detecting the second response or a third response, the terminal device determines that the random access succeeds, where the third response is a response to the second information used for contention resolution.

In some possible implementations, the second information used for contention resolution may be a message 3 in the 4-step contention-based random access procedure. For specific content, refer to the descriptions in S403. For brevity, details are not described herein again.

In some possible implementations, the third response may be a message 4 in the 4-step contention-based random access procedure, and may include the contention resolution information, to indicate that the contention resolution succeeds. Optionally, the contention resolution information may be a UE contention resolution identifier MAC control element (Contention Resolution Identity MAC CE), that is, a part of or all content of the message 3. The contention resolution information may alternatively be the PDCCH scrambled by using the C-RNTI.

It should be noted that, that the contention resolution succeeds is also referred to as that the random access succeeds. To be specific, when determining, based on a monitoring status of the first response, the second response, and the third response, that the contention resolution succeeds, the terminal device may also consider that the random access succeeds; when determining, based on a monitoring status of the first response, the second response, and the third response, that the contention resolution fails, the terminal device may also consider that the random access fails. For ease of description, that the contention resolution succeeds or the contention resolution fails is collectively referred to as that the random access succeeds or the random access fails in this embodiment of this application.

To monitor the first response and the second response, the network device may send configuration information of two monitoring windows to the terminal device, and define a first monitoring window and a second monitoring window. The first monitoring window is used to monitor the first response, and the second monitoring window is used to monitor the second response.

The first monitoring window may be a RAR window in the current technology, or may be a monitoring window that is reconfigured by the network device and that is used to monitor the first response. Specific names of the first monitoring window and the second monitoring window are not limited in this embodiment of this application. In addition, the monitoring window may also be referred to as a timer.

In addition, the first monitoring window and the second monitoring window may be started or restarted at a same moment, or may be started or restarted at different moments. For example, the first monitoring window is started or restarted after the terminal device completes sending the random access signal. For example, the first monitoring window is started or restarted on the first PDCCH resource (for example, a PDCCH occasion) after transmission of the random access signal ends, or the first monitoring window is started or restarted after a time offset after transmission of the random access signal ends. The time offset may be predefined, or may be configured on a network device side. The second monitoring window is started or restarted after the terminal device completes sending or retransmitting a physical uplink shared channel (PUSCH). For example, the second monitoring window is started or restarted on the first symbol (for example, a symbol) after transmission or retransmission of the PUSCH ends, or the second monitoring window is started or restarted after a time offset after transmission or retransmission of the PUSCH ends. The time offset may be predefined, or may be configured on the network device side. Alternatively, the first monitoring window and the second monitoring window are simultaneously started or restarted after the terminal device completes sending or retransmitting a PUSCH. For example, the first monitoring window and the second monitoring window are simultaneously started or restarted on the first symbol (for example, a symbol) after transmission or retransmission of the PUSCH ends, or the first monitoring window and the second monitoring window are simultaneously started or restarted after a time offset after transmission or retransmission of the PUSCH ends. The time offset may be predefined, or may be configured on a network device side. Alternatively, the first monitoring window and the second monitoring window are simultaneously started or restarted after the terminal device completes sending the random access signal. For example, the first monitoring window and the second monitoring window are simultaneously started or restarted on the first PDCCH resource (for example, a PDCCH occasion) after transmission of the random access signal ends, or the first monitoring window and the second monitoring window are simultaneously started or restarted after a time offset after transmission of the random access signal ends. The time offset may be predefined, or may be configured on a network device side.

It should be understood that the foregoing manners of starting or restarting the first monitoring window and the second monitoring window are merely examples. This is not limited in this embodiment of this application.

If the terminal device first detects the second response and determines that random access succeeds, the terminal device stops the first monitoring window and the second monitoring window, and determines that the random access of this time succeeds.

It should be understood that stopping the first monitoring window means stopping monitoring the first response, and stopping the second monitoring window means stopping monitoring the second response.

It should be noted that, in this application, stopping a monitoring window means stopping monitoring a corresponding response. For brevity, details are not described in the following.

If the terminal device first detects the first response, the terminal device stops the first monitoring window but does not stop the second monitoring window, and performs backoff to the 4-step random access procedure while continuing to monitor the second response. In other words, the terminal device performs 2-step random access and the 4-step random access in parallel. When it is determined that either of the 2-step random access procedure and the 4-step random access procedure succeeds, the terminal device stops the 2-step random access procedure and the 4-step random access procedure, and determines that the random access of this time succeeds, thereby reducing a delay in the random access.

Random access backoff means that backoff is performed from a 2-step contention-based random access procedure to a 4-step contention-based random access procedure.

Specifically, if the network device controls the terminal device to perform backoff from the 2-step contention-based random access procedure to the 4-step contention-based random access procedure, the network device may send, to the terminal device, the first response to the random access signal. Optionally, the first response includes the uplink grant information, the timing advance command, and the TC-RNTI. Subsequently, the terminal device may perform S403 and S404 in FIG. 4 based on the received first response, to perform random access backoff.

In some possible implementations, when the terminal device first detects the first response, and detects the second response before a time domain position of the uplink grant included in the first response and determines that random access succeeds, the terminal device stops the second monitoring window and determines that the random access of this time succeeds.

In some possible implementations, when the terminal device first detects the first response, and the second monitoring window expires before the time domain position of the uplink grant included in the first response, the terminal device stops monitoring the second response, and continues to perform the 4-step random access procedure, that is, perform S403 and S404 in FIG. 4. If determining that the 4-step random access procedure succeeds, the terminal device stops the 4-step random access procedure; if determining that the 4-step random access procedure fails, the terminal device re-initiates the 2-step random access or the 4-step random access. Alternatively, when the second monitoring window expires, the terminal device directly stops the first monitoring window and re-initiates the 2-step random access or the 4-step random access.

Alternatively, the terminal device detects the second response after the time domain position of the uplink grant included in the first response. In this case, because the terminal device has sent the message 3 on the uplink grant, and has started or restarted a third monitoring window, the terminal device monitors the third response in the third monitoring window while monitoring the second response in the second monitoring window, where the third response may be the contention resolution information in the 4-step random access procedure, that is, the message 4, and the second information used for contention resolution may be the message 3 in the 4-step random access procedure. If the terminal device first detects the second response and determines that random access succeeds, it indicates that the 2-step random access procedure succeeds, so that the terminal device stops the second monitoring window and the third monitoring window, stops the 4-step random access procedure, and determines that the random access of this time succeeds.

Similarly, if the terminal device first detects the third response, it indicates that the 4-step random access procedure succeeds, so that the terminal device stops the second monitoring window and the third monitoring window, stops the 2-step random access procedure, and determines that the random access of this time succeeds.

Optionally, that the first response is a RAR message is used as an example. When the terminal device performs decoding by using a RA-RNTI and successfully receives a RAR, and a RAP ID value in the RAR is the same as an index value used when the terminal device sends a preamble, it is considered that the RAR is successfully received. That is, the terminal device successfully detects the first response. When the terminal device detects that the second response to the first information used for contention resolution includes a contention resolution identifier of the terminal device, or the second response is the PDCCH scrambled by using the C-RNTI of the terminal device, or the second response explicitly carries the C-RNTI of the terminal device, the terminal device successfully detects the second response. The third response may be the contention resolution information (message 4) in the 4-step random access, and when the terminal device detects that the third response to the second information used for contention resolution includes a contention resolution identifier of the terminal device, or the third response is the PDCCH scrambled by using the C-RNTI of the terminal device, the terminal device successfully detects the third response.

It should be noted that, the third monitoring window may be a contention resolution timer in the current technology, or may be a new timer reconfigured by the network device. This is not limited in this embodiment of this application.

When the second monitoring window expires during running of the third monitoring window, the terminal device stops monitoring the second response, and continues to monitor the third response in the third monitoring window. If the terminal device detects the third response in the third monitoring window, the terminal device stops the third monitoring window, and determines that the random access of this time succeeds.

Alternatively, if the terminal device does not detect the third response until the third monitoring window expires, it indicates that both the 2-step random access procedure and the 4-step random access procedure fail, so that the terminal device re-initiates random access. The terminal device may initiate the 2-step random access, or may initiate the 4-step random access.

In some possible implementations, when the second monitoring window expires, the terminal device directly stops the third monitoring window and re-initiates random access. The terminal device may initiate the 2-step random access, or may initiate the 4-step random access.

In addition, when the third monitoring window expires during running of the second monitoring window, the terminal device stops monitoring the third response, and continues to monitor the second response in the second monitoring window. If the terminal device detects the second response in the second monitoring window, the terminal device stops the second monitoring window, and determines that the random access of this time succeeds.

Alternatively, if the terminal device does not detect the second response until the second monitoring window expires, it indicates that both the 2-step random access procedure and the 4-step random access procedure fail, so that the terminal device re-initiates random access. The terminal device may initiate the 2-step random access, or may initiate the 4-step random access.

In some possible implementations, when the third monitoring window expires, the terminal device directly stops the second monitoring window and re-initiates random access. The terminal device may initiate the 2-step random access, or may initiate the 4-step random access.

In the foregoing technical solution, when the terminal device performs the random access, to reduce the delay of the terminal device in the random access, after receiving the first response, the terminal device performs backoff to the 4-step random access procedure while continuing to monitor the second response. Therefore, the terminal device performs the 4-step random access procedure while performing the 2-step random access procedure, and when either of the procedures succeeds, the terminal device determines that the random access of this time succeeds, thereby greatly reducing the delay of the terminal device in the random access.

In some possible implementations, when the terminal device first detects the first response, the terminal device directly stops the first monitoring window and the second monitoring window, directly performs backoff from the 2-step random access procedure to the 4-step random access procedure, and continues to perform a subsequent procedure of the 4-step random access, that is, perform S403 and S404 in FIG. 4, so that a processing process of the terminal device is simplified, and power consumption of the terminal device is reduced.

Alternatively, when the terminal device detects the first response, the terminal device stops the first monitoring window, and continues to monitor the second response in the second monitoring window. When the terminal device detects the second response during running of the second monitoring window and determines that random access succeeds, the terminal device stops the second monitoring window, stops the 2-step random access procedure, and determines that the random access of this time succeeds. When the terminal device does not detect the second response until the second monitoring window expires, the terminal device stops the 2-step random access procedure, and determines whether the terminal device can perform backoff to the 4-step random access procedure at this time. If the terminal device can perform backoff to the 4-step random access procedure, to be specific, when a current moment has not reached the time domain position of the uplink grant included in the first response, the terminal device performs backoff from the 2-step random access procedure to the 4-step random access procedure, and continues to perform a subsequent step in the 4-step random access procedure, that is, perform S403 and S404 in FIG. 4. If a current moment exceeds the time domain position of the uplink grant included in the first response, the terminal device cannot perform backoff from the 2-step random access procedure to the 4-step random access procedure. Therefore, the terminal device re-initiates random access. The terminal device may initiate the 2-step random access, or may initiate the 4-step random access. Because the terminal device first performs the 2-step random access procedure during the random access, when the 2-step random access procedure fails, the terminal device directly performs backoff to the 4-step random access procedure or re-initiates random access, so that the processing process of the terminal device is simplified, and the power consumption of the terminal device is reduced.

Optionally, if the second monitoring window still runs when the first monitoring window expires, the terminal device continues to monitor the second response, and until the terminal device detects the second response during running of the second monitoring window and determines that random access succeeds, the terminal device stops the second monitoring window, and determines that the random access of this time succeeds; or if the terminal device does not detect the second response until the second monitoring window expires, the terminal device determines that the random access of this time fails, and re-initiates the 2-step random access or the 4-step random access. Alternatively, when the first monitoring window expires, the terminal device stops the second monitoring window and re-initiates the 2-step random access or the 4-step random access.

Alternatively, if the first monitoring window still runs when the second monitoring window expires, the terminal device continues to monitor the first response, and when the terminal device detects the first response during running of the first monitoring window, the terminal device continues to perform the 4-step random access procedure, that is, perform S403 and S404 in FIG. 4. If determining that the 4-step random access succeeds, the terminal device stops the 4-step random access procedure; if determining that the 4-step random access fails, the terminal device re-initiates the 2-step random access or the 4-step random access. Alternatively, if the terminal device does not detect the first response until the first monitoring window expires, the terminal device determines that the random access of this time fails, and re-initiates the 2-step random access or the 4-step random access. Alternatively, when the second monitoring window expires, the terminal device directly stops the first monitoring window and re-initiates the 2-step random access or the 4-step random access.

In addition, if the terminal device does not detect the first response and the second response until the first monitoring window and the second monitoring window expires, the terminal device determines that the random access of this time fails, and re-initiates the 2-step random access or the 4-step random access.

In some possible implementations, the terminal device may monitor the first response and the second response in one monitoring window. To be specific, the network device sends configuration information of one monitoring window to the terminal device, where the monitoring window is used to monitor both the first response and the second response.

The monitoring window may reuse a monitoring window or a timer in the current technology, for example, a RAR monitoring window (RAR window) or a contention resolution timer, or may be a monitoring window that is reconfigured by the network device and that is used to monitor the first response and the second response. A specific name of the monitoring window is not limited in this embodiment of this application. For ease of description, a first monitoring window is used as an example in this embodiment of this application.

It should be further noted that the first monitoring window in this embodiment of this application and a second monitoring window below are not the same as the first monitoring window and the second monitoring window in the foregoing embodiment.

The terminal device starts or restarts the first monitoring window after completing sending or retransmitting a PUSCH, for example, starts or restarts the first monitoring window on the first symbol (for example, a symbol) after transmission or retransmission of the PUSCH ends, or starts or restarts the first monitoring window after a time offset after transmission or retransmission of the PUSCH ends. The time offset may be predefined, or may be configured on a network device side. Alternatively, the terminal device starts or restarts the first monitoring window after completing sending the random access signal, for example, starts or restarts the first monitoring window on the first PDCCH resource (for example, a PDCCH occasion) after transmission of the random access signal ends, or starts or restarts the first monitoring window after a time offset after transmission of the random access signal ends. The time offset may be predefined, or may be configured on a network device side. This is not limited in this embodiment of this application.

If the terminal device detects the second response in the first monitoring window and determines that random access succeeds, the terminal device stops the first monitoring window, and determines that the random access of this time succeeds.

It should be understood that, because the terminal device monitors both the first response and the second response in the first monitoring window, when the terminal device stops the first monitoring window, the terminal device stops monitoring the first response and the second response. For brevity, details are not described below.

If the terminal device first detects the first response in the first monitoring window, the terminal device stops monitoring the first response but does not stop the first monitoring window, and performs backoff to the 4-step random access procedure while continuing to monitor the second response. In other words, the terminal device performs the 2-step random access and the 4-step random access in parallel. When it is determined that either of the 2-step random access procedure and the 4-step random access procedure succeeds, the terminal device stops the 2-step random access procedure and the 4-step random access procedure, and determines that the random access of this time succeeds, thereby reducing a delay in the random access.

For example, when the terminal device first detects the first response in the first monitoring window, and detects the second response before the time domain position of the uplink grant included in the first response and determines that random access succeeds, the terminal device stops the first monitoring window and determines that the random access of this time succeeds.

In some possible implementations, when the terminal device detects the first response, and the first monitoring window expires before the time domain position of the uplink grant included in the first response, the terminal device stops monitoring the second response, and continues to perform the 4-step random access procedure, that is, perform S403 and S404 in FIG. 4. If determining that the 4-step random access succeeds, the terminal device stops the 4-step random access procedure; if determining that the 4-step random access fails, the terminal device re-initiates the 2-step random access or the 4-step random access. Alternatively, when the first monitoring window expires, the terminal device re-initiates the 2-step random access or the 4-step random access.

Alternatively, the terminal device detects the second response after the time domain position of the uplink grant included in the first response. In this case, because the terminal device has sent the message 3 on the uplink grant, and has started or restarted the second monitoring window, the terminal device monitors the third response in the second monitoring window while monitoring the second response in the first monitoring window, where the third response may be the contention resolution information in the 4-step random access procedure, that is, the message 4, and the second information used for contention resolution may be the message 3 in the 4-step random access procedure. If the terminal device first detects the second response and determines that random access succeeds, it indicates that the 2-step random access procedure succeeds, so that the terminal device stops the first monitoring window and the second monitoring window, stops the 4-step random access procedure, and determines that the random access of this time succeeds.

Similarly, if the terminal device first detects the third response, it indicates that the 4-step random access procedure succeeds, so that the terminal device stops the first monitoring window and the second monitoring window, stops the 2-step random access procedure, and determines that the random access of this time succeeds.

When the first monitoring window expires during running of the second monitoring window, the terminal device stops monitoring the second response, and continues to monitor the third response in the second monitoring window. If the terminal device detects the third response in the second monitoring window, the terminal device stops the second monitoring window, and determines that the random access of this time succeeds.

Alternatively, if the terminal device does not detect the third response until the second monitoring window expires, it indicates that both the 2-step random access procedure and the 4-step random access procedure fail, so that the terminal device re-initiates random access. The terminal device may initiate the 2-step random access, or may initiate the 4-step random access.

In some possible implementations, when the first monitoring window expires, the terminal device directly stops the second monitoring window and re-initiates random access. The terminal device may initiate the 2-step random access, or may initiate the 4-step random access.

In addition, when the second monitoring window expires during running of the first monitoring window, the terminal device stops monitoring the third response, and continues to monitor the second response in the first monitoring window. If the terminal device detects the second response in the first monitoring window, the terminal device stops the first monitoring window, and determines that the random access of this time succeeds.

Alternatively, if the terminal device does not detect the second response until the first monitoring window expires, it indicates that both the 2-step random access procedure and the 4-step random access procedure fail, so that the terminal device re-initiates random access. The terminal device may initiate the 2-step random access, or may initiate the 4-step random access.

In some possible implementations, when the second monitoring window expires, the terminal device directly stops the first monitoring window and re-initiates random access. The terminal device may initiate the 2-step random access, or may initiate the 4-step random access.

In the foregoing technical solution, when the terminal device performs the random access, to reduce the delay of the terminal device in the random access, after receiving the first response, the terminal device performs backoff to the 4-step random access procedure while continuing to monitor the second response. Therefore, the terminal device performs the 4-step random access procedure while performing the 2-step random access procedure, and when either of the procedures succeeds, the terminal device determines that the random access of this time succeeds, thereby greatly reducing the delay of the terminal device in the random access.

In some possible implementations, when the terminal device first detects the first response in the first monitoring window, the terminal device directly stops the first monitoring window, directly performs backoff from the 2-step random access procedure to the 4-step random access procedure, and continues to perform a subsequent procedure of the 4-step random access, that is, perform S403 and S404 in FIG. 4, so that a processing process of the terminal device is simplified, and power consumption of the terminal device is reduced.

Alternatively, when the terminal device detects the first response in the first monitoring window, the terminal device stops monitoring the first response, and continues to monitor the second response in the first monitoring window. When the terminal device detects the second response during running of the first monitoring window and determines that random access succeeds, the terminal device stops the first monitoring window, stops the 2-step random access procedure, and determines that the random access of this time succeeds. When the terminal device does not detect the second response until the first monitoring window expires, the terminal device stops the 2-step random access procedure, and determines whether the terminal device can perform backoff to the 4-step random access procedure at this time. If the terminal device can perform backoff to the 4-step random access procedure, to be specific, when a current moment has not reached the time domain position of the uplink grant included in the first response, the terminal device performs backoff from the 2-step random access procedure to the 4-step random access procedure, and continues to perform a subsequent step in the 4-step random access procedure, that is, perform S403 and S404 in FIG. 4. If a current moment exceeds the time domain position of the uplink grant included in the first response, the terminal device cannot perform backoff from the 2-step random access procedure to the 4-step random access procedure. Therefore, the terminal device re-initiates random access. The terminal device may initiate the 2-step random access, or may initiate the 4-step random access. Because the terminal device first performs the 2-step random access procedure during the random access, when the 2-step random access procedure fails, the terminal device directly performs backoff to the 4-step random access procedure or re-initiates random access, so that the processing process of the terminal device is simplified, and the power consumption of the terminal device is reduced.

Optionally, if the terminal device does not detect the first response and the second response until the first monitoring window expires, the terminal device determines that the random access of this time fails, and re-initiates the 2-step random access or the 4-step random access.

It should be understood that the foregoing description is merely intended to help a person skilled in the art better understand the embodiments of this application, but is not intended to limit the scope of the embodiments of this application. Clearly, a person skilled in the art can make various equivalent modifications or changes based on the examples provided above. Alternatively, any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein.

It should be further understood that sequence numbers of the foregoing processes do not mean execution sequences. The execution sequences of the processes should be determined based on functions and internal logic of the processes, and should not constitute any limitation on implementation processes of the embodiments of this application.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail an example of the random access method provided in this application. It can be understood that, to implement the foregoing functions, a communications apparatus includes a corresponding hardware structure and/or software module for performing the functions. A person skilled in the art should easily be aware that, in combination with units and algorithm steps of the examples described in the embodiments disclosed in this application, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

An embodiment of this application further provides an apparatus configured to implement any one of the foregoing methods. For example, an apparatus is provided. The apparatus includes units (or means) configured to implement the steps performed by the terminal device in any one of the foregoing methods. For another example, another apparatus is further provided. The apparatus includes units (or means) configured to implement the steps performed by the network device in any one of the foregoing methods.

Figure 7:
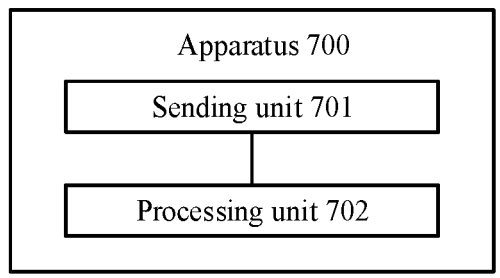
FIG. 7 is a schematic structural diagram of an apparatus according to an embodiment of this application.

FIG. 7 is a schematic structural diagram of an apparatus according to an embodiment of this application. It should be understood that the apparatus 700 shown in FIG. 7 is merely an example. The apparatus 700 in this embodiment of this application may further include another module or unit, or include a unit with a function similar to that of each unit in FIG. 7, or may not necessarily include all units in FIG. 7. As shown in FIG. 7, the apparatus 700 includes a sending unit 701 and a processing unit 702.

In some possible implementations, the apparatus 700 may be a terminal device.

The sending unit 701 is configured to send, to a network device, a random access signal and first information used for contention resolution.

The processing unit 702 is configured to monitor a first response and a second response, where the first response is a response to the random access signal and includes an uplink grant, and the second response is a response to the first information used for contention resolution.

When the first response is detected, and the second response is detected before a time domain position of the uplink grant, the processing unit 702 determines that random access succeeds.

When the first response is detected, the sending unit 701 sends second information used for contention resolution by using the uplink grant; and when the second response or a third response is detected, the processing unit 702 determines that random access succeeds, where the third response is a response to the second information used for contention resolution.

In this embodiment of this application, after sending the random access signal and the first information used for contention resolution to the network device, the terminal device monitors the first response corresponding to the random access signal and the second response corresponding to the first information used for contention resolution, and determines whether the random access succeeds based on a monitoring status of the first response, the second response, and the third response. When determining whether the random access succeeds, the terminal device performs a 2-step random access procedure and a 4-step random access procedure in parallel, thereby reducing a delay of the terminal device in the random access.

Optionally, the processing unit 702 is specifically configured to: in response to transmission of the random access signal, start or restart a first monitoring window, and monitor the first response in the first monitoring window; and in response to transmission of the first information used for contention resolution, start or restart a second monitoring window, and monitor the second response in the second monitoring window.

Optionally, the processing unit 702 is further specifically configured to: when determining that the random access succeeds, stop the second monitoring window.

For example, when the terminal device detects the second response in the second monitoring window and determines that random access succeeds, the terminal device stops the second monitoring window, and determines that the random access succeeds.

Optionally, the processing unit 702 is further configured to: in response to transmission of the second information used for contention resolution, start or restart a third monitoring window, and monitor the third response in the third monitoring window.

Optionally, the processing unit 702 is further configured to: when detecting the second response in the second monitoring window, stop the second monitoring window and the third monitoring window; or when detecting the third response in the third monitoring window, stop the second monitoring window and the third monitoring window.

In the foregoing technical solution, when detecting the second response, the terminal device determines that the 2-step random access succeeds, so that the terminal device stops the second monitoring window and the third monitoring window, stops the 4-step random access procedure, and determines that the random access of this time succeeds. Alternatively, when detecting the third response, the terminal device determines that the 4-step random access succeeds, so that the terminal device stops the second monitoring window and the third monitoring window, stops the 2-step random access procedure, and determines that the random access of this time succeeds. The terminal device performs the 2-step random access procedure and the 4-step random access procedure in parallel, and when either of the procedures succeeds, the terminal device determines that the random access of this time succeeds, thereby greatly reducing the delay in the random access.

Optionally, the processing unit 702 is further configured to: when the second monitoring window expires during running of the third monitoring window, stop monitoring the second response, and continue to monitor the third response; and when detecting the third response in the third monitoring window, determine that the random access succeeds; or when not detecting the third response in the third monitoring window, re-initiate random access.

The random access may be the 2-step random access or the 4-step random access. This is not limited in this embodiment of this application.

Optionally, the processing unit 702 is further configured to: when the second monitoring window expires during running of the third monitoring window, stop the third monitoring window, and re-initiate random access, where the random access may be the 2-step random access or the 4-step random access. When the 2-step random access procedure fails, the terminal device directly stops the 2-step random access procedure and the 4-step random access procedure, and directly re-initiates random access, thereby reducing power consumption of the terminal device.

Optionally, the processing unit 702 is further configured to: when the third monitoring window expires during running of the second monitoring window, stop monitoring the third response, and continue to monitor the second response; and when detecting the second response in the second monitoring window, determine that the random access succeeds; or when not detecting the second response in the second monitoring window, re-initiate random access, where the random access may be the 2-step random access or the 4-step random access.

The terminal device performs the 2-step random access procedure and the 4-step random access procedure in parallel. When the 4-step random access procedure fails, the terminal device continues to perform the 2-step random access procedure, and when the 2-step random access procedure succeeds, the terminal device determines that the random access of this time succeeds. When the 2-step random access procedure fails, the terminal device determines that the random access of this time fails, and directly re-initiates random access. Because the terminal device performs the 2-step random access procedure and the 4-step random access procedure during the random access, when either of the random access procedures succeeds, the terminal device can determine that the random access procedure of this time succeeds, thereby reducing the delay of the terminal device in the random access.

Optionally, the processing unit 702 is further configured to: when the first monitoring window expires during running of the second monitoring window, continue to monitor the second response; and
- when detecting the second response in the second monitoring window, determine that the random access succeeds; or
- when not detecting the second response in the second monitoring window, re-initiate random access, where the random access may be the 2-step random access or the 4-step random access.

Optionally, the processing unit 702 is further configured to: when the second monitoring window expires during running of the first monitoring window, continue to monitor the first response, where when the first response is detected, the second information used for contention resolution is sent by using the uplink grant; and
- when detecting the third response, determine that the random access succeeds; or
- when not detecting the third response, re-initiate random access, where the random access may be the 2-step random access or the 4-step random access.

In some possible implementations, the terminal device may monitor the first response and the second response in one monitoring window.

Optionally, the processing unit 702 is further configured to: in response to transmission of the random access signal and/or transmission of the first information used for contention resolution, start or restart a first monitoring window, and monitor the first response and the second response in the first monitoring window.

Optionally, the processing unit 702 is further configured to: when determining that the random access succeeds, stop the first monitoring window.

For example, when the terminal device detects the second response in the first monitoring window and determines that random access succeeds, the terminal device stops the first monitoring window, and determines that the random access of this time succeeds.

Optionally, the processing unit 702 is further configured to: in response to transmission of the second information used for contention resolution, start or restart a second monitoring window, and monitor the third response in the second monitoring window.

Optionally, the processing unit 702 is further configured to: when detecting the second response in the first monitoring window, stop the first monitoring window and the second monitoring window; or
- when detecting the third response in the second monitoring window, stop the first monitoring window and the second monitoring window.

Optionally, the processing unit 702 is further configured to: when the first monitoring window expires during running of the second monitoring window, stop monitoring the second response, and continue to monitor the third response; and
- when detecting the third response in the second monitoring window, determine that the random access succeeds; or
- when not detecting the third response in the second monitoring window, re-initiate random access.

Optionally, the processing unit 702 is further configured to: when the first monitoring window expires during running of the second monitoring window, stop the second monitoring window, and re-initiate random access.

Optionally, the processing unit 702 is further configured to: when the second monitoring window expires during running of the first monitoring window, stop monitoring the third response, and continue to monitor the second response; and
- when detecting the second response in the first monitoring window, determine that the random access succeeds; or
- when not detecting the second response in the first monitoring window, re-initiate random access.

It should be understood that division into the units in the foregoing apparatus is merely logical function division. During actual implementation, all or some of the units may be integrated into one physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit of the processing element, or may be implemented in a form of software invoked by the processing element.

For example, a unit in any apparatus may be one or more integrated circuits configured to implement the foregoing method, for example, one or more specific integrated circuits (ASIC), one or more microprocessors (DSP), one or more field programmable gate arrays (FPGA), or a combination of at least two of these types of integrated circuits. For another example, when a unit in the apparatus is implemented by a program scheduled by a processing element, the processing element may be a general purpose processor, for example, a central processing unit (CPU) or another processor that can invoke the program. For still another example, the units may be integrated and implemented in a form of a system-on-a-chip (SOC).

The apparatus further includes receiving unit, which is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 8:
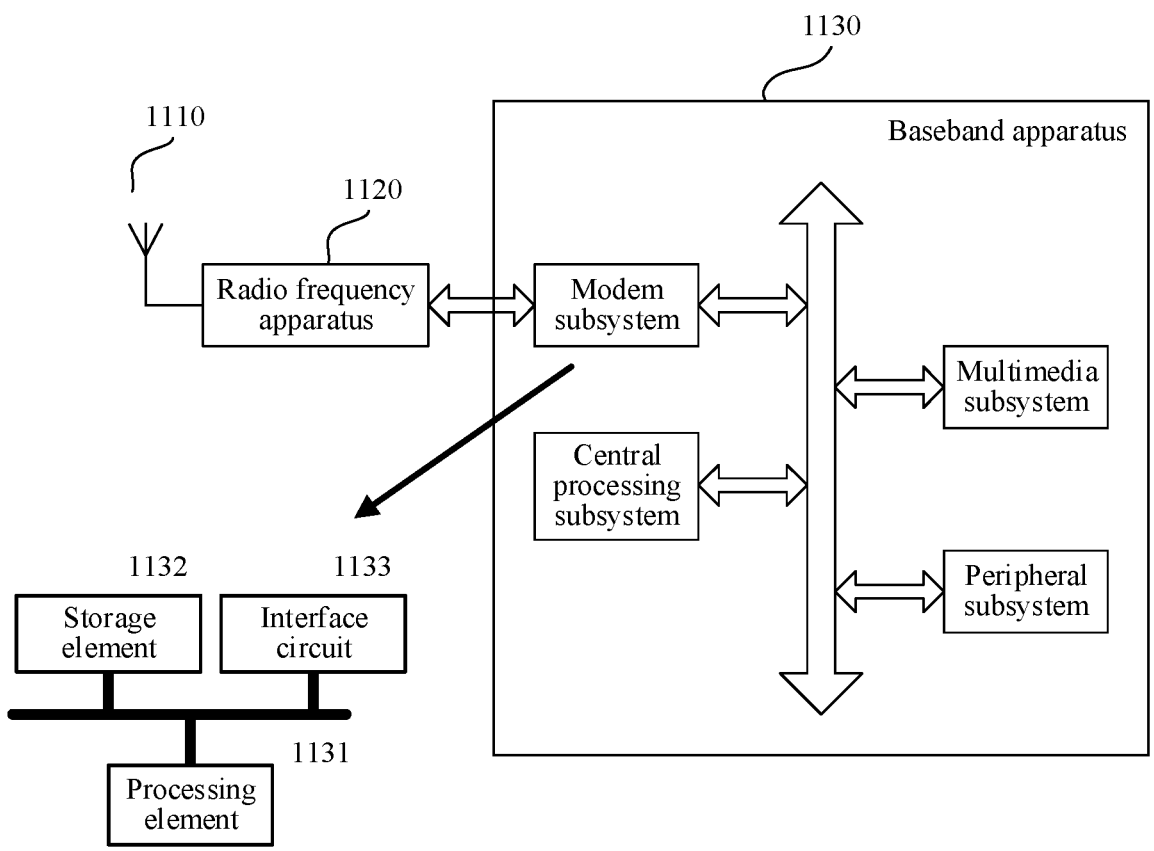
FIG. 8 is a schematic structural diagram of a terminal device according to an embodiment of this application.

FIG. 8 is a schematic structural diagram of a terminal device according to an embodiment of this application. The terminal device may be the terminal device in the foregoing embodiment, and is configured to implement an operation of the terminal device in the foregoing embodiment. As shown in FIG. 8, the terminal device includes an antenna 1110, a radio frequency part 1120, and a signal processing part 1130. The antenna 1110 is connected to the radio frequency part 1120. In a downlink direction, the radio frequency part 1120 receives, through the antenna 1110, information sent by a network device, and sends, to the signal processing part 1130 for processing, the information sent by the network device. In an uplink direction, the signal processing part 1130 processes information of the terminal device, and sends the information to the radio frequency part 1120. The radio frequency part 1120 processes the information of the terminal device, and then sends the information to the network device through the antenna 1110.

The signal processing part 1130 may include a modem subsystem, configured to process data at each communications protocol layer. The signal processing part 1130 may further include a central processing subsystem, configured to implement processing of an operating system and an application layer of the terminal device. In addition, the signal processing part 1130 may further include another subsystem, for example, a multimedia subsystem or a peripheral subsystem. The multimedia subsystem is configured to control a camera or a screen display of the terminal device, and the peripheral subsystem is configured to implement a connection to another device. The modem subsystem may be a separately disposed chip. Optionally, the foregoing apparatus used for the terminal device may be located in the modem subsystem.

The modem subsystem may include one or more processing elements 1131, for example, include one main control CPU and another integrated circuit. In addition, the modem subsystem may further include a storage element 1132 and an interface circuit 1133. The storage element 1132 is configured to store data and a program. However, a program used to perform the method performed by the terminal device in the foregoing method may not be stored in the storage element 1132, but is stored in a memory outside the modem subsystem, and is loaded and used by the modem subsystem when to be used. The interface circuit 1133 is configured to communicate with another subsystem. The foregoing apparatus used for the terminal device may be located in the modem subsystem, and the modem subsystem may be implemented by a chip. The chip includes at least one processing element and an interface circuit. The processing element is configured to perform the steps of any method performed by the terminal device. The interface circuit is configured to communicate with another apparatus. In an implementation, units of the terminal device that implement the steps of the foregoing method may be implemented by a program invoked by a processing element. For example, the apparatus used for the terminal device includes a processing element and a storage element. The processing element invokes a program stored in the storage element, to perform the method performed by the terminal device in the foregoing method embodiment. The storage element may be a storage element located on a same chip as the processing element, that is, an on-chip storage element.

In another implementation, a program used to perform the method performed by the terminal device in the foregoing methods may be in a storage element located on a different chip from the processing element, namely, an off-chip storage element. In this case, the processing element invokes or loads the program from the off-chip storage element to the on-chip storage element, to invoke and perform the method performed by the terminal device in the foregoing method embodiments.

In still another implementation, units of the terminal device that implement the steps in the foregoing method may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal device that implement the steps in the foregoing method may be integrated together and implemented in a form of an SOC. The SOC chip is configured to implement the method. At least one processing element and storage element may be integrated into the chip, and the processing element invokes a program stored in the storage element to implement the foregoing method performed by the terminal device. Alternatively, at least one integrated circuit may be integrated into the chip, to implement the foregoing method performed by the terminal device. Alternatively, with reference to the foregoing implementations, functions of some units may be implemented by the processing element invoking a program, and functions of some units may be implemented by the integrated circuit.

It can be learned that the foregoing apparatus used for the terminal device may include at least one processing element and an interface circuit. The at least one processing element is configured to perform any method that is provided in the foregoing method embodiments and that is performed by the terminal device. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processing element in combination with an instruction; or may certainly perform, by combining the first manner and the second manner, some or all steps performed by the terminal device.

As described above, the processing element herein may be a general-purpose processor, for example, a CPU, or may be one or more integrated circuits configured to implement the foregoing method, for example, one or more ASICs, one or more microprocessors DSPs, one or more FPGAs, or a combination of at least two of these types of integrated circuits.

The storage element may be one memory, or may be a general term of a plurality of storage elements.

An embodiment of this application further provides a communications system, including the foregoing terminal device and the network device.

This application provides a computer-readable storage medium. The computer-readable storage medium stores a computer instruction. When the computer instruction is run on a computer, the computer is enabled to perform a corresponding operation and/or procedure performed by the terminal device in the method embodiments.

This application further provides a computer program product including an instruction, and when the computer program product runs on a computer, the computer is enabled to perform the steps performed by the terminal device in the method shown in FIG. 6.

This application further provides a chip, including a processor. The processor is configured to read and run a computer program stored in a memory, to perform a corresponding operation and/or procedure performed by the terminal device in the random access method provided in this application. Optionally, the chip further includes the memory, the memory and the processor are connected through a circuit or a wire, and the processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, or a digital-to-analog converter. The processor may allocate control and signal processing functions of a terminal device or a network device between these devices based on respective functions of the devices. In addition, the processor may have functions for operating one or more software programs, and the software programs may be stored in a memory. The functions of the processor may be implemented by hardware or may be implemented by hardware executing corresponding software. The hardware or the software includes one or more modules corresponding to the foregoing functions.

The memory may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, any other medium that can be used to carry or store expected program code in a form of an instruction or a data structure and that can be accessed by a computer, or the like.

Optionally, in the foregoing embodiments, the memory and the processor may be physically independent units, or the memory may be integrated with the processor.

The terms "uplink" and "downlink" in this application are used to describe data/information transmission directions in a specific scenario. For example, an "uplink" direction is usually a direction in which data/information is transmitted from a terminal to a network side, or a direction in which data/information is transmitted from a distributed unit to a central unit, and a "downlink" direction is usually a direction in which data/information is transmitted from a network side to a terminal, or a direction in which data/information is transmitted from a central unit to a distributed unit. It may be understood that "uplink" and "downlink" are only used to describe transmission directions of data/information, and neither a specific device from which data/information transmission starts nor a specific device at which data/information transmission stops is limited.

Names may be assigned to various objects that may appear in this application, for example, various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

In the embodiments of this application, architectures of the CU and the DU are not limited to the 5G NR gNB, and may be further applied to a scenario in which an LTE base station is divided into the CU and the DU. The CU may be further divided into two parts: a CP and a UP. Optionally, in the LTE base station, the protocol layer does not include an SDAP layer.

In the embodiments of this application, "at least one" means one or more, and "a plurality of" means two or more. "And/or" describes an association relationship between associated objects and represents that three relationships may exist. For example, A and/or B may represent the following cases: Only A exists, both A and B exist, and only B exists. A and B may be singular or plural. The character "/" usually represents an "or" relationship between the associated objects. "At least one of the following" or a similar expression thereof indicates any combination of the following, including any combination of one or more of the following. For example, at least one of a, b, and c may indicate: a, b, c, a-b, a-c, b-c, or a-b-c, where a, b, and c may be singular or plural.

A person of ordinary skill in the art may be aware that, in combination with units and algorithm steps described in the embodiments disclosed in this specification, this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus, and method may be implemented in other manners. For example, the described apparatus embodiments are merely examples. For example, the unit division is merely logical function division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may not be physically separate, and parts displayed as units may not be physical units, and may be located at one position, or may be distributed on a plurality of network units. Some or all of the units may be selected based on actual requirements to achieve the objectives of the technical solutions of this application.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A random access method applied to a terminal device, the method comprising:
receiving configuration information of at least two monitoring windows from a network device;
wherein the at least two monitoring windows at least partially overlap;
based on the configuration information, initiating parallel 2-step and 4-step random access procedures by
sending, to the network device, a random access signal and a physical uplink shared channel (PUSCH) comprising first information used for contention resolution,
wherein the random access signal is used to request random access based on either the 2-step or 4-step random access procedure, and
wherein the first information includes an identifier of the terminal device;
starting or restarting, by the terminal device, the at least two monitoring windows on a first symbol after sending the PUSCH;
monitoring, by the terminal device, for receipt of a first response and a second response to the random access signal and PUSCH, respectively, in respective one of the at least two monitoring windows,
wherein the first response is associated with both the 2-step and 4-step random access procedures, and
wherein the second response is associated with only the 2-step random access procedures,
in response to detecting the first response in a first of the at least two monitoring windows, performing, by the terminal, backoff from the 2-step random access procedure and continuing the 4-step random access procedure while continuing to monitor for receipt of the second response during a second of the at least two monitoring windows; and
stopping, by the terminal, the first of the at least two monitoring windows based on detecting the second response in the second of the at least two monitoring windows and determining that the contention resolution succeeds based on the 2-step random access procedure.

2. The method according to claim 1, wherein the first response comprises uplink grant information and a timing advance command,
wherein the uplink grant information indicates an uplink resource allocated by the network device, and
wherein the timing advance command indicates a timing advance; and
wherein performing the backoff from the 2-step random access procedure and continuing the 4-step random access procedure comprises:
sending to the network device, based on the first response and on the uplink resource indicated by the uplink grant information, a message 3 in the 4-step random access procedure by using the timing advance indicated by the timing advance command; and
receiving a message 4 in the 4-step random access procedure from the network device,
wherein the random access signal is a message 1 in the 4-step random access procedure, and
wherein the first response is a message 2 in the 4-step random access procedure.

3. The method according to claim 1, wherein determining whether the random access succeeds based on the 4-step random access procedure includes-detecting a third response in the at least two monitoring windows:
wherein the first response comprises an uplink grant for sending second information used for contention resolution, and
wherein the third response is a response to the second information used for contention resolution.

4. The method according to claim 1, wherein the second response is a physical downlink control channel (PDCCH) scrambled by using a cell radio network temporary identifier (C-RNTI).

5. The method according to claim 1, wherein the first response comprises one or more of the following information: a random access preamble identifier (RAP ID), a timing advance command, uplink grant information, and a temporary cell radio network temporary identifier (TC-RNTI); and
the second response comprises one or more of the following information: a part of or all of the first information used for contention resolution, or a physical downlink control channel (PDCCH) scrambled by using a cell radio network temporary identifier (C-RNTI) or a cell radio network temporary identifier (C-RNTI).

6. An apparatus comprising:
one or more processors;
a non-transitory memory coupled to the one or more processors, wherein the non-transitory memory stores a program to be executed by the one or more processors, the program including instructions for at least the following operations:

receiving configuration information of at least ee two monitoring windows from a network device, wherein the at least two monitoring windows at least partially overlap;

based on the configuration information, initiating parallel 2-step and 4-step random access procedures by sending, to the network device, a random access signal and a physical uplink shared channel (PUSCH) comprising first information used for contention resolution, wherein the random access signal is used to request random access based on either the 2-step or 4-step random access procedure, and wherein the first information includes an identifier of the terminal device;

starting or restarting the at least two monitoring windows on a first symbol after sending the PUSCH;

monitoring for receipt of a first response and a second response to the random access signal and PUSCH, respectively, in respective one of the at least two monitoring windows, wherein the first response is associated with both the 2-step random access procedure and includes at least part of a content of a random access response (RAR) used in the 4-step contention-based random access procedure, and wherein the second response is associated with only the 2-step random access procedure;

in response to detecting the first response in a first of the at least two monitoring windows, performing backoff from the 2-step random access procedure and continuing the 4-step random access procedure while continuing to monitor for receipt of the second response during a second of the at least two monitoring windows; and stopping the first of the at least two monitoring windows based on detecting the second response in the at least two monitoring windows and determining that the contention resolution succeeds based on the 2-step random access procedure.

7. A non-transitory computer readable medium, wherein the non-transitory computer readable medium stores instructions that are executable by a computer and cause the computer to perform at least the following operations:

receiving configuration information of at least two monitoring windows from a network device, wherein the at least two monitoring windows at least partially overlap; and based on the configuration information, initiating parallel 2-step and 4-step random access procedures by sending, to a network device, a random access signal and a physical uplink shared channel (PUSCH) comprising first information used for contention resolution, wherein the random access signal is used to request random access based on either the 2-step or 4-step random access procedure, and wherein the first information includes an identifier of the terminal device;

starting or restarting the at least two monitoring windows on a first symbol after sending the PUSCH;

monitoring for receipt of a first response and a second response to the random access signal and PUSCH, respectively, in respective one of the at least e-ne two monitoring windows, wherein the first response is associated with both the 2-step and 4-step random access procedure, and wherein the second response is associated with only the 2-step random access procedure;

in response to detecting the first response in a first of the at least two monitoring windows, performing backoff from the 2-step random access procedure and continuing the 4-step random access procedure while continuing to monitor for receipt of the second response during a second of the at least two monitoring windows; and stopping the first of the at least two monitoring windows based on detecting the second response in the at least two monitoring windows and determining that the contention resolution succeeds based on the 2-step random access procedure.

8. The apparatus according to claim 6, wherein the program further includes further instructions for determining whether the random access succeeds comprising instructions for determining that the random access fails based on the at least two monitoring windows expiring and the first response and the second response are not detected.

9. The non-transitory computer readable medium according to claim 7, wherein the instructions further include instructions for determining whether the random access succeeds comprising instructions for determining that the random access fails based on the at least two monitoring windows expiring and the first response and the second response are not detected.

10. The apparatus according to claim 6, wherein the first response comprises uplink grant information and a timing advance command, wherein the uplink grant information indicates an uplink resource allocated by the network device, and wherein the timing advance command indicates a timing advance; and wherein performing the backoff from the 2-step random access procedure and continuing the 4-step random access procedure comprises:

sending to the network device, based on the first response and on the uplink resource indicated by the uplink grant information, a message 3 in the 4-step random access procedure by using the timing advance indicated by the timing advance command; and receiving a message 4 in the 4-step random access procedure from the network device, wherein the random access signal is a message 1 in the 4-step random access procedure, and wherein the first response is a message 2 in the 4-step random access procedure.

11. The apparatus according to claim 6, wherein determining whether the random access succeeds based on the 4-step random access procedure includes detecting a third response in the at least two monitoring windows, wherein the first response comprises an uplink grant or sending second information used for contention resolution, and wherein the third response is a response to the second information used for contention resolution.

12. The apparatus according to claim 6, wherein the second response is a physical downlink control channel (PDCCH) scrambled by using a cell radio network temporary identifier (C-RNTI).

13. The apparatus according to claim 6, wherein the first response comprises one or more of the following information: a random access preamble identifier (RAP ID), a timing advance command, uplink grant information, and a temporary cell radio network temporary identifier (TC-RNTI); and the second response comprises one or more of the following information: a part of or all of the first information used for contention resolution, or a physical downlink control channel (PDCCH) scrambled by using a cell radio network temporary identifier (C-RNTI) or a cell radio network temporary identifier (C-RNTI).

14. The non-transitory computer readable medium according to claim 7, wherein the first response comprises uplink grant information and a timing advance command,
wherein the uplink grant information indicates an uplink resource allocated by the network device, and
wherein the timing advance command indicates a timing advance; and
wherein performing the backoff from the 2-step random access procedure and continuing the 4-step random access procedure comprises:
sending to the network device, based on the first response and on the uplink resource indicated by the uplink grant information, a message 3 in the 4-step random access procedure by using the timing advance indicated by the timing advance command; and
receiving a message 4 in the 4-step random access procedure from the network device,
wherein the random access signal is a message 1 in the 4-step random access procedure, and
wherein the first response is a message 2 in the 4-step random access procedure.

15. The non-transitory computer readable medium according to claim 7, wherein determining whether the random access succeeds based on the 4-step random access procedure includes detecting a third response in the at least two monitoring windows,
wherein the first response comprises an uplink grant or sending second information used for contention resolution, and
wherein the third response is a response to the second information used for contention resolution.

16. The non-transitory computer readable medium according to claim 7, wherein the second response is a physical downlink control channel (PDCCH) scrambled by using a cell radio network temporary identifier (C-RNTI).

17. The non-transitory computer readable medium according to claim 7, wherein the first response comprises one or more of the following information: a random access preamble identifier (RAP ID), a timing advance command, uplink grant information, and a temporary cell radio network temporary identifier (TC-RNTI); and
the second response comprises one or more of the following information: a part of or all of the first information used for contention resolution, or a physical downlink control channel (PDCCH) scrambled by using a cell radio network temporary identifier (C-RNTI) or a cell radio network temporary identifier (C-RNTI).

* * * * *

UNITED STATES PATENT AND TRADEMARK OFFICE
CERTIFICATE OF CORRECTION

PATENT NO. : 12,309,848 B2
APPLICATION NO. : 17/515045
DATED : May 20, 2025
INVENTOR(S) : Zhao et al.

It is certified that error appears in the above-identified patent and that said Letters Patent is hereby corrected as shown below:

In the Claims

Claim 1: Column 29, Line 67: "2-step random access procedures," should read as -- 2-step random access procedure, --.

Claim 3: Column 30, Line 38: "random access procedure includes-detecting a third response" should read as -- random access procedure includes detecting a third response --.

Claim 3: Column 30, Line 39: "in the at least two monitoring windows:" should read as -- in the at least two monitoring windows; --.

Claim 6: Column 31, Line 1: "receiving configuration information of at least ee two" should read as -- receiving configuration information of at least two --.

Claim 7: Column 31, Line 64: "respectively, in respective one of the at least e-ne two" should read as -- respectively, in respective one of the at least two --.

Signed and Sealed this
Fourteenth Day of October, 2025

John A. Squires
*Director of the United States Patent and Trademark Office*